R. CHANDLER.
AY BRAKE.
ED APR. 12, 1915.

1,168,604.

Patented Jan. 18, 1916.
2 SHEETS—SHEET 1.

Inventor
WILLARD R. CHANDLER

By Thomas R. Harney
Attorney

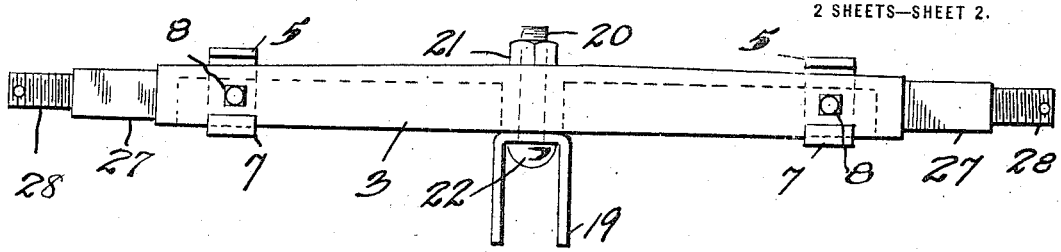
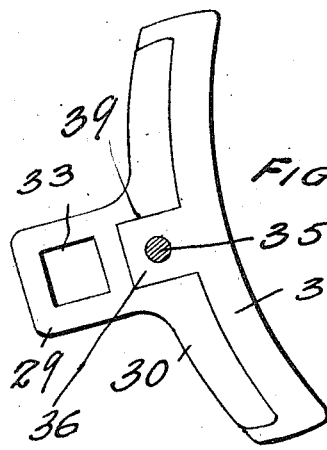
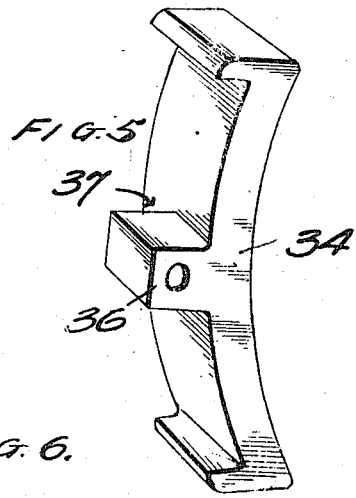
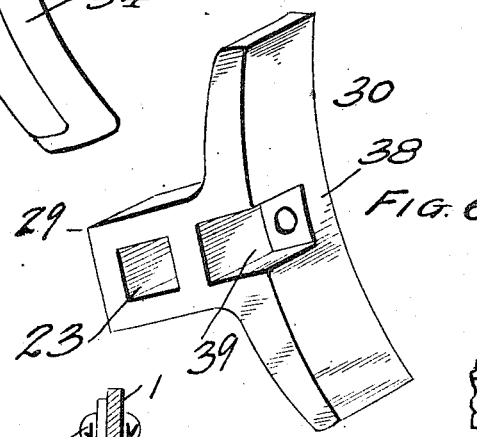
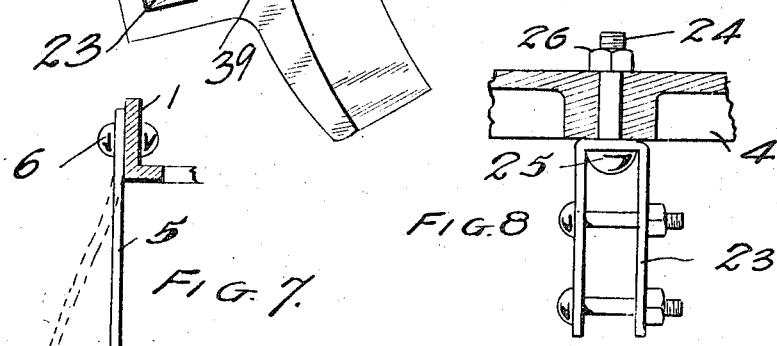

UNITED STATES PATENT OFFICE.

WILLARD R. CHANDLER, OF SUMTER, SOUTH CAROLINA.

RAILWAY-BRAKE.

1,168,604.  Specification of Letters Patent.  Patented Jan. 18, 1916.

Application filed April 12, 1915. Serial No. 20,892.

*To all whom it may concern:*

Be it known that I, WILLARD R. CHANDLER, citizen of the United States of America, residing at Sumter, in the county of Sumter and State of South Carolina, have invented certain new and useful Improvements in Railway-Brakes, of which the following is a specification.

The present invention relates to improvements in railway brakes, and is designed especially for the purpose of guarding against accidental displacement or loss of parts of brake devices for railroad cars, locomotive tenders, etc.

The primary object of the invention is the provision of a railway brake, including the brake shoe and its connection with the brake head, in which the parts are safely attached and connected to the supporting parts of the rolling stock.

Numerous accidents are occasioned by the fact that parts of the brake device frequently become loose and fall to the railroad track. When a car with such a faulty brake device is in motion and such an accident occurs the consequence in many cases is that the succeeding cars of the train are thrown from the track with accompanying injury and damage. In my improved railway brake I have devised means by which the parts of the braking device are prevented from falling to the track, but are supported in such manner that loss and displacement are avoided and resulting dangers eliminated.

In the accompanying drawings I have illustrated one complete example of the physical embodiment of my invention constructed according to the best mode I have so far devised for the practical application of the principles of my invention.

Figure 1:
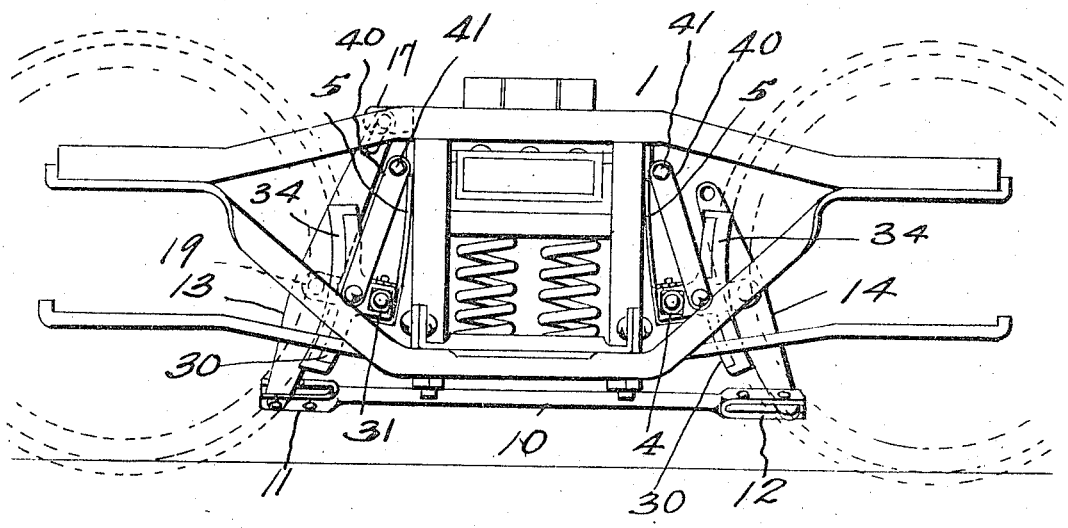
Figure 2:
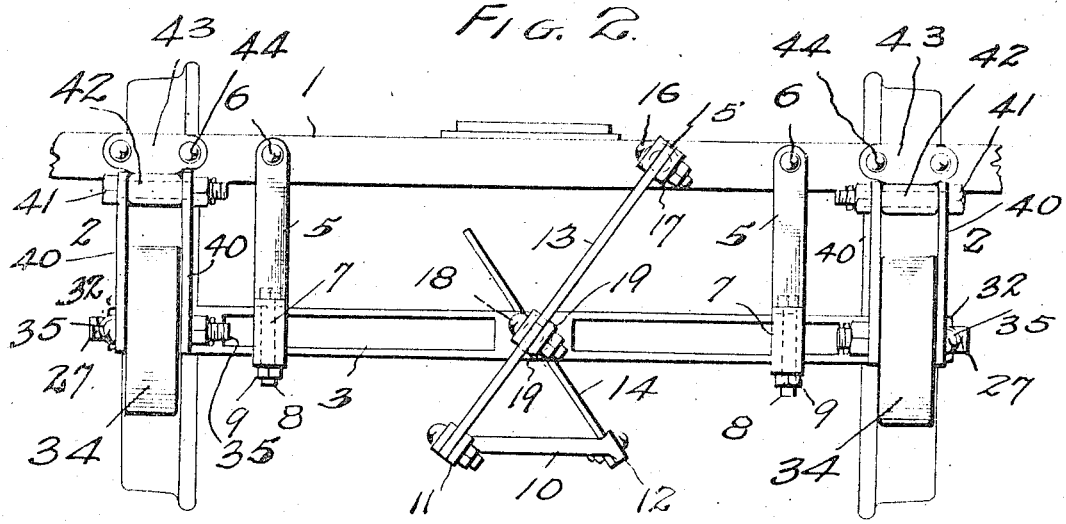

Figure 1 is a side elevation of a portion of a car truck of the four wheel type, sufficient to illustrate my invention, the brake device being supported from the truck bolster frame shown in the drawing. Fig. 2 is a view taken transversely of the car to which the truck is attached, but showing the bolster frame and brake beam in longitudinal elevation and the brakes at the ends of the beam. Fig. 3 is a top plan view of one of the brake beams. Fig. 4 is an enlarged vertical sectional view of a brake head and its shoe. Fig. 5 is a perspective view of the brake shoe detached. Fig. 6 is a perspective view of the brake head, detached. Fig. 7 is a sectional detail view showing the spring support for the brake beam. Fig. 8 is a fragmentary sectional detail view of one of the brake beams.

In the preferred embodiment of my invention as illustrated in the drawings, the bolster frame 1 is of usual and standard type forming part of the railroad car truck, and from this bolster frame the operating parts of my brake are supported and suspended.

I have illustrated my invention as embodied in a four wheel truck, and inasmuch as the four braking devices indicated as a whole by the numeral 2, are of similar construction, it is believed the description and operation of the device for one wheel will suffice for all of the wheel brakes.

The brakes are suspended from the bolster frame, each brake in operative proximity to its wheel, and the brakes are supported from one of the pair of beams 3, 4. These beams are supported from the bolster frame by means of a pair of metallic straps as 5, 5, which are riveted at 6 to the bolster. At the lower end, each strap is bent upwardly and over at the top to form a yoke 7 in which the beam rests, and the beam is secured in its place by means of a bolt 8, passed vertically through perforations in the beam and yoke, and a nut 9 holds the bolt in place. The metallic straps 5 are preferably of resilient steel so that the beams 3, 4, may swing with relation to the bolster when the car brake is actuated.

Between the two beams 3, 4, and under the truck extends the longitudinal bar 10 which is forked at its ends as at 11 and 12 to receive the fulcrum bar 13 and lever 14 respectively. The forks of the bar are arranged in planes at right angles to each other in order that the bar may be used either as a "right hand" bar or as a "left hand" bar, thus adapting it for use on either end of any of the standard cars used upon the railroads. The fulcrum bar 13 has its upper slotted end 15 pivoted at 16 in the yoke 17 which is riveted as usual to the bolster frame 1; while the fulcrum bolt or pivot 18 connects the fulcrum bar to the swiveled housing or yoke 19. This yoke 19 is held to the brake beam 3 by means of a bolt 20, passed transversely through a central opening in the beam and secured by a nut 21. The head 22 of the bolt holds the yoke to the beam, but it will be apparent that the yoke may be turned on its bolt when the nut 21 is loosened thus providing for adjustment of the yoke to support the fulcrum bar 13, whether swung to the right or to the left. The lever 14 is similarly attached to its beam 4. Here the yoke 23 is adjustably held to the beam 4 by means of the bolt 24, its head 25 and the nut 26, and it will be apparent that the yoke may be swung on its bolt when the nut 26 is loosened, and that it may be clamped to its beam by turning home the nut, as is the case with the yoke for the fulcrum bar.

At its two ends, each beam has a reduced squared extension 27 and a threaded end 28, the former to receive the boss 29 of the brake head 30, and the latter to receive the nut 31 to hold the head in place. A cotter pin 32 is employed to lock the nut on the threaded extension 28. The boss 29 of the brake head is formed with an opening 33, square in cross section, and by this means it may be slipped into position on the squared extension 27 of the beam.

The brake head 30 has a brake shoe 34 attached thereto by means of a bolt 35 which is passed through a central perforated lug 36 on the inner side of the shoe which extends more than half way across the shoe as shown but leaves a space as 37 into which the bridge piece 38 of the head 30 fits. This bridge piece is formed by cutting out the inner face of the head to form a pocket or socket 39 in which the perforated lug 36 fits. The bridge piece 38 is perforated on a line with the perforated lug so that the bolt 35 may be passed through both lug and bridge piece to lock the brake head and shoe together.

In addition to locking the parts of the brake together, the bolt 35 provides the point of attachment for the lower ends of the hangers 40. These hangers 40, 40 are arranged in pairs and made of metallic, flat plates or strips, perforated at their ends, with their lower ends pivoted on the bolt 35, and their upper ends pivoted on a bolt or pintle 41 which is passed through a spacing sleeve 42 of a plate 43. The plate 43 is riveted at 44 to the side of the bolster 1, and it will be seen that the brake at each end of each beam is thus pivotally suspended from the bolster frame by means of these hangers whose ends are pivoted to the brake and to the bolster. The brake it will be remembered is rigidly fixed on the end of the beam, and the beam is supported from the bolster frame by means of the resilient metallic straps, as before described, so that a pull applied at the upper end of the lever 14 will swing each beam and its brakes away from the bolster frame and apply the brake shoes to the wheels for which they are intended.

When the brakes are released the resiliency of the metallic straps 5, 5, withdraws the brake shoes from the wheels.

By this construction it will be apparent all parts of the brake device are safely guarded against loss. The beam itself is supported, not only by its resilient straps 5, but by the pivoted straps or hangers of the brake, and the brake head and shoe are held against loss from the beam, while the shoe is prevented from separation from its head by the bolt 35 which connects the hangers to the brake.

By the utilization of the transverse bolt for securing the brake shoe and brake head together I have eliminated the vertically arranged key almost universally used on brake devices. As is well known by those familiar with the railroads, these vertically arranged keys are frequently taken from the brake for the purpose of packing the journal box and are not put back or replaced, with the result that the shoe will work loose and fall to the track after the car is in motion, causing wrecks and derailment. If the transverse bolt of my brake is taken from the brake, the shoe is immediately displaced, and cannot, at a future time, cause damage by working loose as is the case with the vertically keyed shoe.

The metallic straps 40 dispense with the necessity of safety chains generally used, render the beam more durable and prevent chattering of hangers and shoes. Considerable strain of the brake is taken off the beam and transferred to the shoe when the brake is applied to the wheel, and the hangers 40 hold the brakes rigid and well braced.

What I claim is:—

1. The combination with a suitable supporting frame and a pair of resilient straps attached thereto each having its free end bent to form a rectangular yoke, of a beam fixed in said yokes, a brake fixed at each end of the beam, and hangers pivoted to said frame and brakes, whereby the brakes are returned to normal position when released from the wheels.

2. The combination with a supporting frame and a pair of resilient straps attached thereto each having its free end bent to form a yoke, of a beam fixed in the yokes, a brake fixed to each end of the beam, supporting hangers on the frame for the brakes, and a second set of straps, hangers, brakes and a beam at the opposite side of the frame, a fulcrum bar pivoted to the frame and to one beam, a lever pivoted to the other beam, and a pivoted connecting bar between the fulcrum bar and the lever.

In testimony whereof I affix my signature.

WILLARD R. CHANDLER.